(12) United States Patent
Brukilacchio

(10) Patent No.: US 8,746,943 B2
(45) Date of Patent: Jun. 10, 2014

(54) LED BACKLIGHTING SYSTEM WITH CLOSED LOOP CONTROL

(75) Inventor: Thomas J. Brukilacchio, Reading, MA (US)

(73) Assignee: Innovations In Optics, Inc., Woburn, MA (US)

( * ) Notice: Subject to any disclaimer, the term of this patent is extended or adjusted under 35 U.S.C. 154(b) by 769 days.

(21) Appl. No.: 12/288,986

(22) Filed: Oct. 24, 2008

(65) Prior Publication Data

US 2009/0122533 A1 May 14, 2009

Related U.S. Application Data

(60) Provisional application No. 60/986,565, filed on Nov. 8, 2007.

(51) Int. Cl.
*F21V 7/04* (2006.01)
*F21V 9/00* (2006.01)

(52) U.S. Cl.
USPC ............ 362/608; 362/621; 362/613; 362/511

(58) Field of Classification Search
USPC ......... 362/607, 608, 610, 231, 601, 555, 621, 362/612, 613, 561, 511, 330, 97.2, 97.1, 362/97.3
See application file for complete search history.

(56) References Cited

U.S. PATENT DOCUMENTS

| | | | |
|---|---|---|---|
| 4,367,519 A | 1/1983 | Houghton et al. | |
| 4,915,479 A | 4/1990 | Clarke | |
| 4,964,025 A | 10/1990 | Smith | |
| 5,146,248 A | 9/1992 | Duwaer et al. | |
| 5,255,171 A | 10/1993 | Clark | |
| 5,289,356 A | 2/1994 | Winston | |
| 5,335,152 A | 8/1994 | Winston | |
| 5,335,158 A | 8/1994 | Kaplan et al. | |
| 5,486,983 A | 1/1996 | Cordier et al. | |
| 5,560,700 A | 10/1996 | Levens | |
| 5,586,013 A | 12/1996 | Winston et al. | |
| 5,699,201 A | 12/1997 | Lee | |
| 5,810,469 A | 9/1998 | Weinreich | |
| 5,816,693 A | 10/1998 | Winston et al. | |
| 5,899,557 A | 5/1999 | McDermott | |

(Continued)

OTHER PUBLICATIONS

Welford, W.T. and Winston, R., High Collection Nonimaging Optics, Academic Press, Inc. San Diego, 1989, pp. 213-215.

(Continued)

*Primary Examiner* — Jong-Suk (James) Lee
*Assistant Examiner* — Bryon T Gyllstrom
(74) *Attorney, Agent, or Firm* — Schmeiser, Olsen & Watts LLP

(57) ABSTRACT

A light emitting diode (LED) based illumination system with particular application to large scale side lighted liquid crystal displays (LCD). The invention uses on board closed loop intensity control in conjunction with red, green and blue (R,G,B) LED die and a hybrid non-imaging optical system to overcome substantial temperature dependence, loss in intensity with time, increased system cost and complexity, and decreased dynamic range. The invention obtains a large color gamut in excess of 110% of the NTSC (National Television System Committee) recommendation. A high performance thermal management design, the use of "chip on board" technology, compact and efficient collection optics, and on board closed loop intensity control increase and maintain luminous performance and decrease cost relative to less efficient RGB LED approaches. One or more line sources can be generated for applications other than in lighting LCD displays.

15 Claims, 16 Drawing Sheets

(56) References Cited

U.S. PATENT DOCUMENTS

| | | | |
|---|---|---|---|
| 6,123,436 A | 9/2000 | Hough et al. | |
| 6,149,283 A | 11/2000 | Conway et al. | |
| 6,200,002 B1 | 3/2001 | Marshall et al. | |
| 6,257,737 B1 | 7/2001 | Marshall et al. | |
| 6,272,269 B1 | 8/2001 | Naum | |
| 6,299,328 B1 | 10/2001 | Wilson | |
| 6,465,961 B1 | 10/2002 | Cao | |
| 6,641,284 B2 | 11/2003 | Stopa et al. | |
| 6,784,603 B2 | 8/2004 | Pelka et al. | |
| 6,791,183 B2* | 9/2004 | Kanelis | 257/718 |
| 7,055,987 B2* | 6/2006 | Staufert | 362/235 |
| 7,077,546 B2* | 7/2006 | Yamauchi et al. | 362/301 |
| 7,267,461 B2 | 9/2007 | Kan et al. | |
| 7,482,567 B2* | 1/2009 | Hoelen et al. | 250/205 |
| 2002/0114168 A1 | 8/2002 | Pelka et al. | |
| 2002/0172039 A1 | 11/2002 | Inditsky | |
| 2004/0218390 A1 | 11/2004 | Holman et al. | |
| 2005/0174779 A1* | 8/2005 | Yoneda et al. | 362/294 |
| 2005/0243570 A1 | 11/2005 | Chaves et al. | |
| 2005/0276061 A1* | 12/2005 | Repetto et al. | 362/516 |
| 2006/0006821 A1 | 1/2006 | Singer et al. | |
| 2006/0109397 A1 | 5/2006 | Anandan | |
| 2006/0146573 A1* | 7/2006 | Iwauchi et al. | 362/621 |
| 2006/0203511 A1* | 9/2006 | Tseng | 362/608 |
| 2006/0221592 A1* | 10/2006 | Nada et al. | 362/29 |
| 2006/0239020 A1* | 10/2006 | Albou | 362/520 |
| 2006/0245208 A1* | 11/2006 | Sakamoto et al. | 362/612 |
| 2007/0127261 A1* | 6/2007 | An et al. | 362/608 |
| 2007/0147036 A1* | 6/2007 | Sakai et al. | 362/240 |
| 2009/0168395 A1* | 7/2009 | Mrakovich et al. | 362/84 |

OTHER PUBLICATIONS

International Search Report and Written Opinion from PCT/US2008/012014 mailed on Jan. 7, 2009.

* cited by examiner

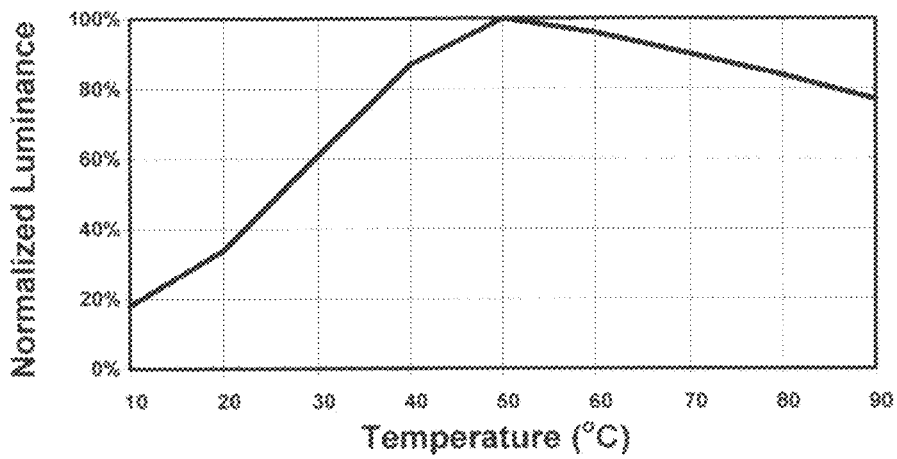
Fig. 5
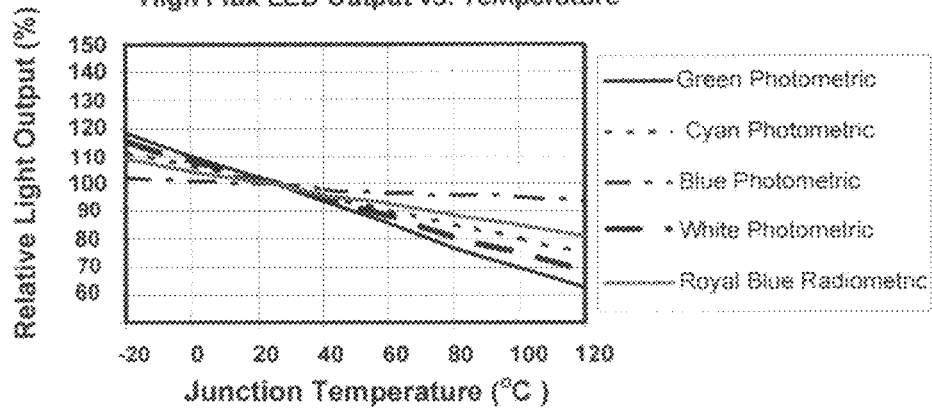
Fig. 6
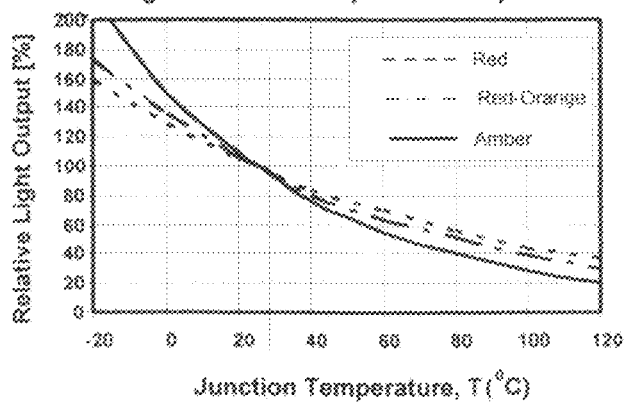

Red & Green Nitride phosphors are most stable at high temperature
(perfect for low and high-Wattage applications).

LED BACKLIGHTING SYSTEM WITH CLOSED LOOP CONTROL

CROSS REFERENCE TO RELATED APPLICATION

This application claims the benefit of priority from U.S. Provisional Patent Application No. 60/986,565 filed in the name of Thomas J. Burkilacchio on Nov. 8, 2007 with the title LED BACKLIGHTING SYSTEM WITH CLOSED LOOP CONTROL, the entire contents of which are incorporated herein by reference.

FIELD OF THE INVENTION

This invention, in general, relates to backlighting apparatus and, more particularly, to the use of light emitting diodes (LEDs) as a source of illumination within a liquid crystal display (LCD) flat panel video system. The invention has application in edge lighted LCD panels and other illumination arrangements requiring one or more line sources.

BACKGROUND OF THE INVENTION

Previous backlight illumination sources for flat panels include cold cathode fluorescent lamp (CCFL), hot cathode fluorescent lamp (HCFL), electro luminescent (EL), organic light emitting diode (OLED) which is generally a broad area emitter, and tungsten and tungsten halogen filament lamps and arc lamps in conjunction with woven fiber optics.

In comparison to these other backlight technologies, LEDs combine the advantages of low voltage operation, high reliability, long life, wide color gamut, high contrast, shock and vibration safe, contain no mercury, have high luminous efficiency, operate over a wide ambient temperature range between −40 and +85° C., rapid switching speed, dimmable by pulse width modulation (PWM), reduced blur (owing to short response time relative to LCD switching time), and are particularly well suited for edge lighted illumination. While these advantages make the use of LEDs very attractive for LCD backlighting applications, a number of challenges still remain. These challenges include luminous efficiency, cost, system design complexity, including the need for new power supplies and controllers, independent closed loop intensity control of red, green, blue (RGB) based systems, and thermal control requirements associated with the use of RGB based systems.

The prior art shows an approach replacing CCFLs by the use of red, green, and blue LEDs in combination. While this approach has the benefits of improved color gamut and contrast relative to CCFLs, it suffers from thermal instability, primarily due to the strong red, and to a lesser but still significant extent, the green dependence on the LED intensity on temperature.

The prior art uses a number of photodiodes distributed throughout the lighting system to address this problem, but the photodiodes are separate from the LED source to control the LED intensity. However, this approach adds considerable cost and complexity to the overall system.

This temperature dependence is addressed by the present invention by use of closed loop feedback control, which maintains a constant brightness both as a function of time and temperature. The present invention can work with either LED excited phosphors or with standard red, green and blue LED die.

In view of the many shortcomings of the prior art, it is a principal object of the present invention to provide an improved backlighting source employing LEDs for use in illuminating LCD flat panel screens and the like.

It is another object of the present invention to provide an LED based source of illumination having improved color gamut and contrast.

It is yet another object of the present invention to provide an LED based linear light source.

It is still another object of the present invention to provide an LED based illumination source having relaxed thermal management needs and simplified control requirements.

It is yet another object of the present invention to provide an improved LED board architecture by which closed loop intensity control is implemented and high thermal performance achieved.

Another object of the present invention to use multiple emitters on a single LED board to significantly reduce cost over the approach of using prepackaged devices.

Yet another object of the present invention is to provide an optical system in a narrow and short package which allows for low divergence output in a direction normal to an LCD panel.

Other objects of the present invention will be obvious and will appear hereinafter when the following detailed description is read in connection with the accompanying drawings.

SUMMARY OF THE INVENTION

The invention herein generally relates to an LED based illumination system for generating one or more line sources that have particular utility in backlighting liquid crystal display (LCD) panels to achieve improved color gamut and contrast or can be used for other applications requiring bright, uniform line sources.

More particularly, the invention is an Illumination apparatus for producing high intensity line sources of uniform intensity and spectral content, comprising an elongated support member having formed thereon a linear array of regularly spaced LED modules each of which comprises one or more LED emitting areas having a predetermined spectral output that is emitted over a predetermined solid angle. An elongated collection optic is provided with an array of non-imaging concentrators the individual non-imaging concentrators of which are optically coupled in one-to-one correspondence with the LED modules. Each non-imaging concentrator in the array of non-imaging concentrators operates to collect radiation emitted by each of the LED modules and to re-emit substantially all of the collected radiation as a diverging beam having a solid angle smaller than the predetermined solid angle over which radiation is emitted by each of said LED modules. The diverging beam is spatially and spectrally uniform in the near field of the exit aperture and propagates in a direction along an optical axis of the apparatus. Finally, an elongated converging optical element is positioned to receive the diverging beam and converge it in a vertical plane to form a line source of predetermined dimensions.

The LED modules have LED emitting areas that are selected from the group comprising R,G,B LEDs, Blue LEDs used to excite red and green phosphor, and Blue and Green LEDs used to excite red phosphor.

The non-imaging concentrators are selected from the group comprising compound parabolic, elliptical, hyperbolic concentrators, straight tapers, and concentrators having curvatures described by higher order polynomial functions.

In a preferred embodiment, the non-imaging concentrators are rectangular in cross section to control the divergence of the diverging beams in vertical and horizontal planes mutually perpendicular to the optical axis of the apparatus.

In another aspect of the invention, the illumination apparatus of the collection optic further includes an elongated mixing section having a single continuous surface for receiving the diverging beams from the non-imaging concentrators, mixing their colors for more spectral and spatial uniformity, and re-emitting them along an exit face thereof for travel to the elongated converging optical element.

In another aspect of the invention, the illumination apparatus collection optic further includes an elongated θ by θ compound parabolic concentrator section following the mixing section and a second elongated truncated compound parabolic concentrator section following the θ by θ compound parabolic concentrator section. The θ by θ compound parabolic concentrator section is structured to receive the light emerging from the exit face of the mixer section and direct it into the elongated truncated compound parabolic concentrator section after which the light emerging from the second elongated truncated compound parabolic concentrator section strikes the elongated converging optical element. Preferably the elongated converging optical element comprises a cylindrical lens having one or more aspheric surfaces but may also be an off-axis parabolic reflector.

Further included is a planar wedge light guide for receiving light from the line source and propagating it along the length of planar wedge guide. The planar wedge guide has small optical features on one surface thereof to deflect light upwards out of the wedge guide through an exit face thereof opposite to the surface having the small optical features.

Additionally included a diffuser positioned opposite the exit face of the planar wedge guide to receive light therefrom to improve its homogeneity and control its angular direction for subsequent use with an LCD display panel, individual output of said LED modules to provide a signal for feedback control of the intensity of light output from said LED modules.

A further attribute of the invention is the use of a high thermal performance LED board to which the LED die are directly attached. This increases the light that can be extracted from the die under high current density conditions, increases LED die lifetime, decreases system complexity, and decreases system cost, as fewer LED die are required to achieve a particular light output.

BRIEF DESCRIPTION OF THE DRAWINGS

The structure, operation, and methodology of the invention, together with other objects and advantages thereof, may best be understood by reading the following detailed description in connection with the drawings in which each part has an assigned numeral or label that identifies it wherever it appears in the various drawings and wherein:

FIG. 5 is a plot of the luminous efficiency of a typical CCFL versus temperature taken from R. Webster SID ADEAC, October 2005;

FIG. 6 shows plots of relative luminous output for GaN LEDs (upper chart) and InGaP LEDs (lower chart) as a function of temperature;

DETAILED DESCRIPTION

The present invention generally relates to liquid crystal display (LCD) backlighting with improved color gamut and contrast. More particularly, the present invention is an LED based light source for improved LCD system performance relative to other light source technologies including other LED sources, CCFL, HCFL, EL, OLED, and arc, and filament lamps used in conjunction with woven fiber optics. While having a principal use as an illumination source for backlighting LCD displays, the inventive source has other applications where one or more line sources may be required.

The illumination system of the invention is based on the use of a linear array of regular spaced sub arrays of one or more light emitting diodes (LEDs) used in conjunction with one or more luminescent materials used in conjunction with corresponding compound parabolic concentrators, or the like, and cylindrical lenses.

The advantages of LED technology are well-known and were outlined above. The disadvantages of three-color RGB approaches described in the prior art are primarily associated with the large temperature coefficients and different long term aging effects. This temperature sensitivity limits effective use of the RGB systems over a narrow range of temperatures thus limiting dynamic range and adding significant cost and complexity associated with external closed loop intensity feed back control that is required. The present invention uses the response from photodiodes located on an LED board along with custom application specific integrated circuit (ASIC) closed loop intensity control to overcome the disadvantages of prior art.

Figure 1:
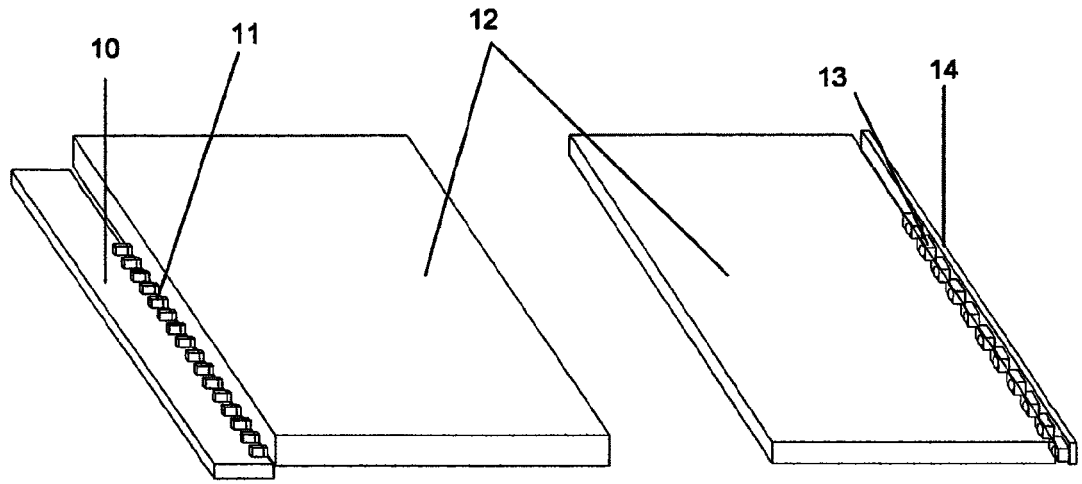
FIG. 1 is a diagrammatic perspective view rendering prior art edge lighted LCD panels with side emitting LEDs on the left and top emitting LEDs on the right.

To understand the benefits, structure and operation of the present invention, the prior art and aspects of the state of LED technology will first be examined and then the details of the invention will be described. Referring then to the left side of FIG. 1, an edge lighted LED source 10 is shown on a printed circuit board (PCB) with prepackaged side emitting LEDs 11 launching light into a standard wedge plate 12. Shown on the right side of FIG. 1 is a 3-color RGB prepackaged LED 13 attached to a similar PCB 14 launching light into wedge plate (again designated at 12).

Figure 2:
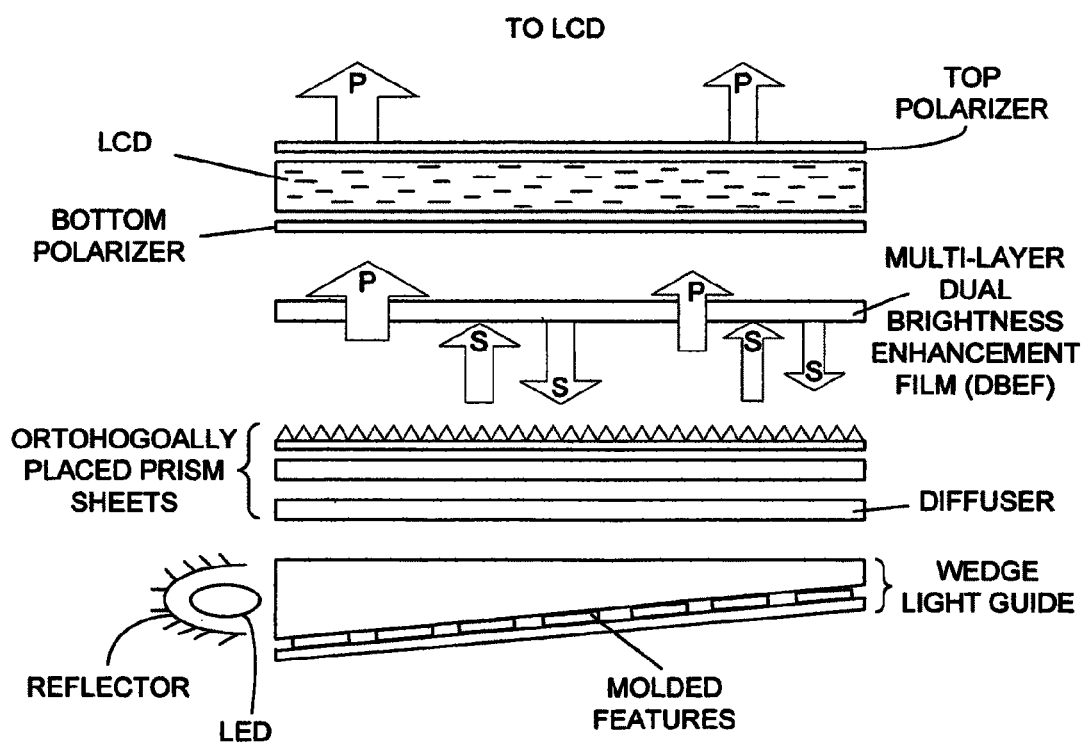
FIG. 2 is a diagrammatic elevational view of a typical prior art edge lighted LCD panel showing the individual components.

A more detailed view of the standard edge lit LCD backlight configuration of the prior art is shown in FIG. 2. Light from the LED is partially coupled by a reflector and partially directly coupled into a wedge light guide. Small features such as diffuse white patterns or molded reflective features deflect light upwards out of the wedge toward a diffuser. The edges of the wedge are typically surrounded by a reflective component to allow light that would otherwise leave the wedge through the side to re-enter the wedge light guide and have another opportunity to be directed toward the diffuser. The diffuser acts to improve the homogeneity of the light which is then coupled toward a set of orthogonally placed prism sheets. The prism sheets act to direct the light incident at large angles to the normal back into the direction of the normal so as to direct them into the acceptance angle of an LCD panel.

The light leaving the prism sheets is then typically directed into a brightness enhancing (BEF) or dual brightness enhancing film (DBEF), such as that produced by the 3M Company. The brightness enhancing film acts to recirculate the s-polarized light such that it is partially converted to the p-polarized light that is required as input to the LCD/polarizer system. The light from the BEF, or DBEF, enters the first polarizer prior to entering the LCD.

The LCD acts as a switch by rotating the polarization state of the light entering it. Only light of the correct polarization can effectively exit the second polarizer. The LCD contains a mosaic of red, green and blue colored filters that are individually addressable. This is what gives the LCD system the ability to modulate the light of individual pixels and create a colored image. Typical efficiency of LCD systems is on the order of 10% or less due to the polarization and angular acceptance limitations of the LCD device.

Figure 3:
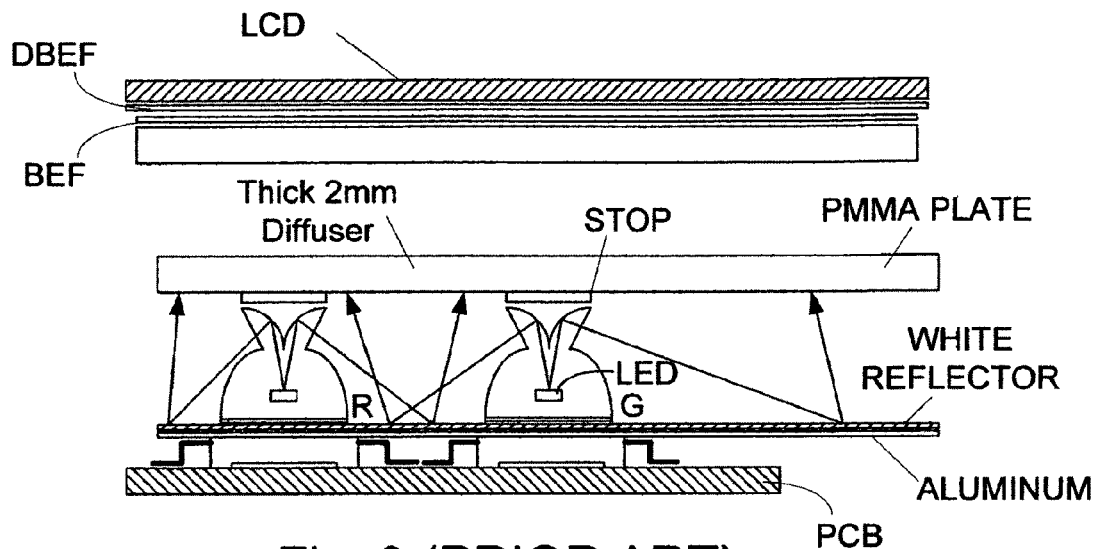
FIG. 3 is a diagrammatic side view of a prior art LumiLeds RGB side emitting direct backlighting system with individual red, green, and blue LED packages mounted to a PCB.
Figure 4:
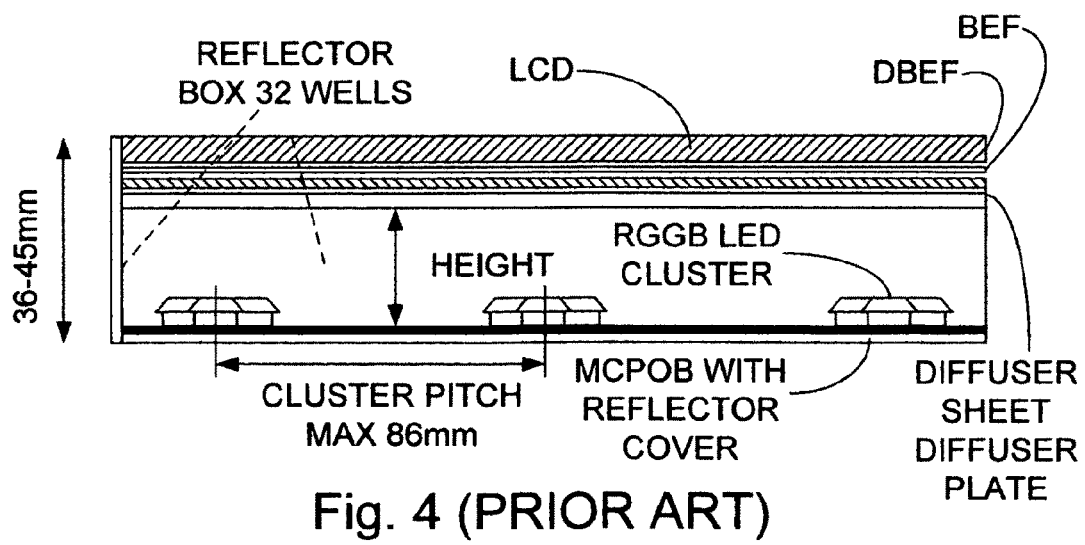
FIG. 4 is a diagrammatic elevational view of a prior art direct backlighting LED LCD illumination system based on the OSRAM 3-color RGB package mounted to a PCB.

FIG. 3 represents a direct LCD backlight system, which is typically used in larger video displays such as home theaters. To achieve high brightness over a large area, the edge light approach is often insufficient, requiring direct illumination or more efficient edge lighted systems such as will be described for the present invention. Thus, a sheet of light must be produced over the entire area of the LCD panel. Individual red, green and blue LED emitters (such as the LumiLeds 1 Watt emitters depicted here) are used. The prepackaged LEDs are attached to a PCB to make electrical connections and a heat sink to dissipate the heat flux. The side emitting LEDs couple light onto a diffuse white reflector which acts to help mix the colors. Individual photodiodes, not shown, are required between the LEDs to provide the closed loop intensity control required due to the thermal dependencies of the different color LEDs. The balance of the components is similar in type and function as described for the edge lighted system of FIG. 2. A similar system is shown in FIG. 4 for which each prepackaged LED (as produced by such manufacturers as OSRAM) are comprised of 4 die, one red, two green, and one blue. This configuration gives some level of mixing. Light can enter the diffuser either directly or by diffusively reflecting off the area between the individual prepackaged LEDs. Again, the balance of the system is typical including the diffuser, BEF and DBEF films, and the LCD panel.

The predominant light source for LCD panels in the year 2006 and prior has been CCFLs. The severe fall off in intensity and lifetime for temperatures below 50° C. has limited the use of the LCD technology to near room temperature operation as can be seen in the plot of FIG. 5. In fact, at low temperature operation, the voltage is often insufficient to even start the lamp. Heating filaments can be introduced as in the case of HCFLs; however, they suffer from higher power consumption and slow start up times.

LEDs represent a much improved performance with regard to start up times and low temperature operation. FIG. 6 shows the strong temperature dependence, however, of the green (top chart) and particularly the red LEDs (lower chart). In contrast, the blue LEDs based on GaN quantum wells (Royal blue radiometric on the left), exhibit very little temperature dependence over the entire temperature range of interest for commercial and military applications. Further, LED output actually increases with decreasing temperature. This strong decrease in output of the red die, typically made of InGaP material, can result in a 4-fold decrease in brightness over the upper end of the temperature range indicated. This severely limits the dynamic range and effective brightness of RGB LED based LCD backlight systems that are not comprised of efficient thermal designs and do not include closed loop on board control.

Also shown is the increased dependence of green LEDs relative to the blue. Additionally, the red, green, and blue LED die age at different rates as they are operated at different current densities. Additionally, the green and red die have a much larger wavelength shift with temperature and current density relative to blue die. These factors all lead to the requirement for closed loop intensity control. This is problematic as it can not be done effectively on the whole system, but needs to be done on a device level as described by the present invention. That is, ideally each color LED source would have an associated monitoring photodiode(s).

As will be seen, the system of this invention in one embodiment uses only a blue LED die. The light from the blue die is directed to one or more phosphors or luminescent materials with the properties of producing blue, green, and red light substantially overlapping with the colored filters of the LCD device. Ideally, minimal light is present in the overlap regions between the spectra which are described in greater detail below. The fact that only one type of LED is present in one preferred embodiment allows the requirement for closed loop intensity control to be relaxed, thereby reducing system complexity and cost associated with the control loop. If lower temperature extremes are expected, the combination of a blue die and green die with red phosphor can be used.

Figure 7:
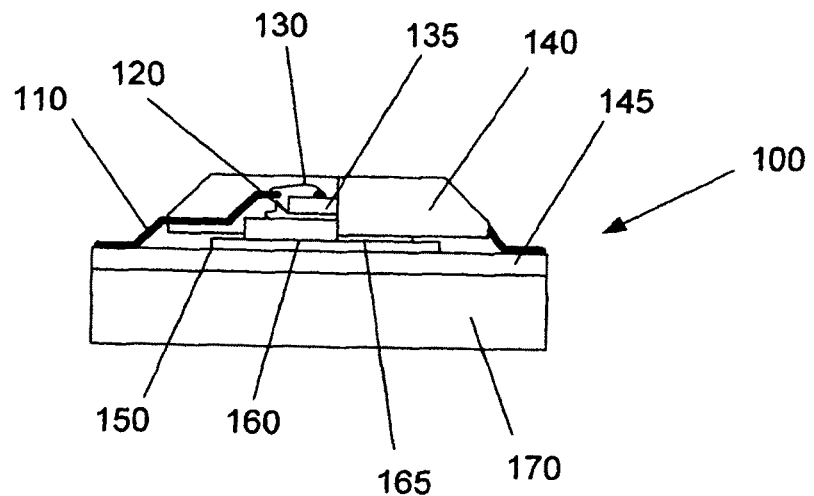
FIG. 7 shows a diagrammatic elevational view of a typical thermal management scheme showing a number of thermal impedance elements between an LED die and a metal substrate.

Another consideration for improved performance relative to prior art is careful attention to thermal packaging considerations. FIG. 7 shows a typical cross section of a prepackaged LED emitter 100 indicating multiple thermal impedances 150, 160, and 120 between an LED die 135 and a metal substrate 170. This is in contrast to the thermal solution of the present invention designated at 200 in FIG. 8. which uses laser ablation or other methods, such as machining or etching, to remove layers of material representing significant thermal impedance between an LED die or die array 240 and a metal substrate 250 (typically made of high thermal conductivity materials, such as copper or other material having suitable bonding and thermal properties). Included in the architecture of 200 are a dielectric layer 230, a foil layer 220 and a mask with printing 210.

Figure 8:
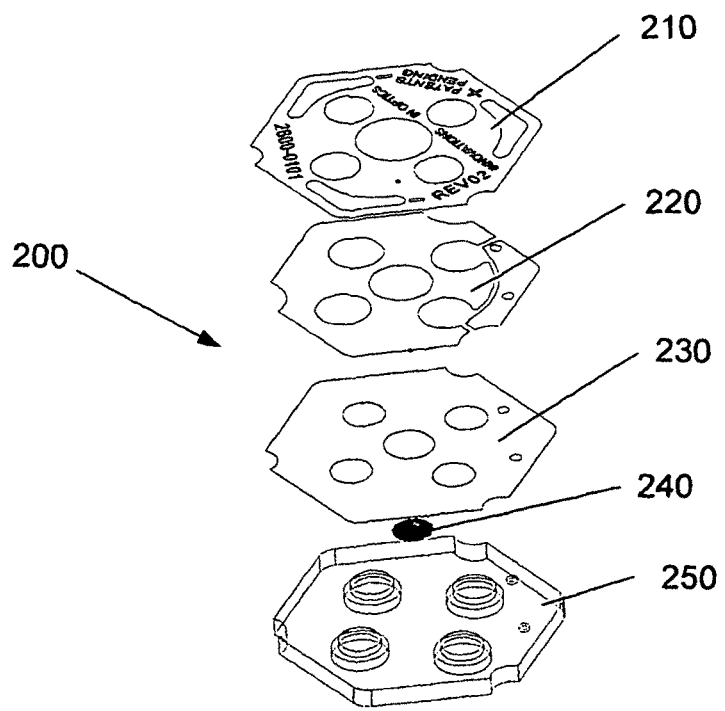
FIG. 8 is an exploded diagrammatic perspective of the thermal approach of this invention for which LED die are attached directly to a highly conductive material for improved thermal performance.
Figure 9:
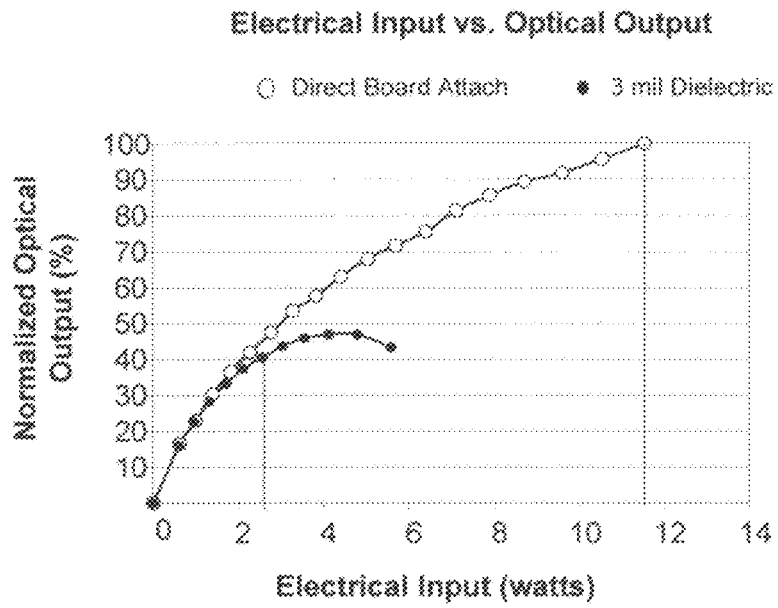
FIG. 9 is a plot of the benefit from bonding the LED die directly to the metal substrate as in FIG. 8 rather than including one or more dielectric layers.

Reference is now made to FIG. 9 which shows a plot of the the improved performance between the typical use of a dielectric layer 230 between the metal substrate 250 and the LEDs 240. This approach allows the same LED (a 1 mm XB900 blue power chip from CREE in this example) to emit more than 250% more light at a lower operating temperature. This improvement in LED junction temperature and extracted light translates into improved system performance and reduced cost, as fewer, or lower, and thus reduced cost, LED die can be used. The system of FIG. 8 can be extended to the use of a multiple LED die board as will be described later.

As will be seen, the use of multiple die on a single board instead of multiple prepackaged LED emitters significantly lowers system cost, complexity, and enhances system performance due to much improved thermal management. Attaching the LED die directly to the substrate requires the LED die to be operated in a parallel electrical drive arrangement. If series operation is required either to assure equal current through each LED die or lower current and higher voltage operation, then an alternative low thermal impedance approach is to keep the dielectric deposited over the aluminum or copper metal substrate in tact and cover it with a thicker foil layer, such as generally in the range of 2 to 10 ounce foil which would then act as a very efficient heat spreader. This method of reducing the heat flux through the dielectric is an effective alternative to achieving low thermal impedance in the event that series operation of the LED drive is required.

FIG. 9 indicates the advantage for the case of thin foil over dielectric versus ablation through the dielectric indicating much improved performance for identical LED die and drive current densities.

Figure 10:
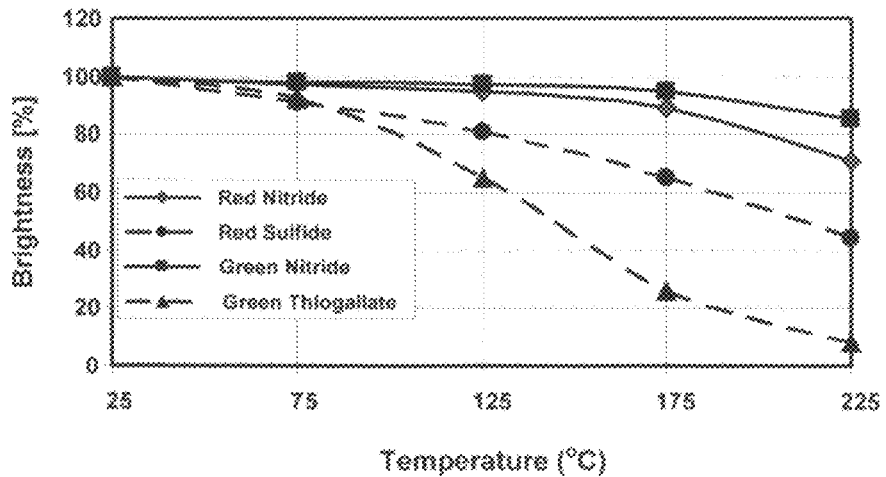
FIG. 10 is a plot of the thermal quenching characteristic of phosphors.

Reference is now made to FIG. 10 for its showing of how the properties of phosphors used with LEDs can change with temperature. The plot of FIG. 10 indicates that typical phosphors also exhibit some degradation in efficiency with elevated temperature. This could lead to a decrease in overall brightness and temperature dependence if different phosphors or luminescent materials are used. This problem can be substantially eliminated by thermally decoupling the LED die from the phosphor or other luminescent material as will be explained below.

Figure 11:
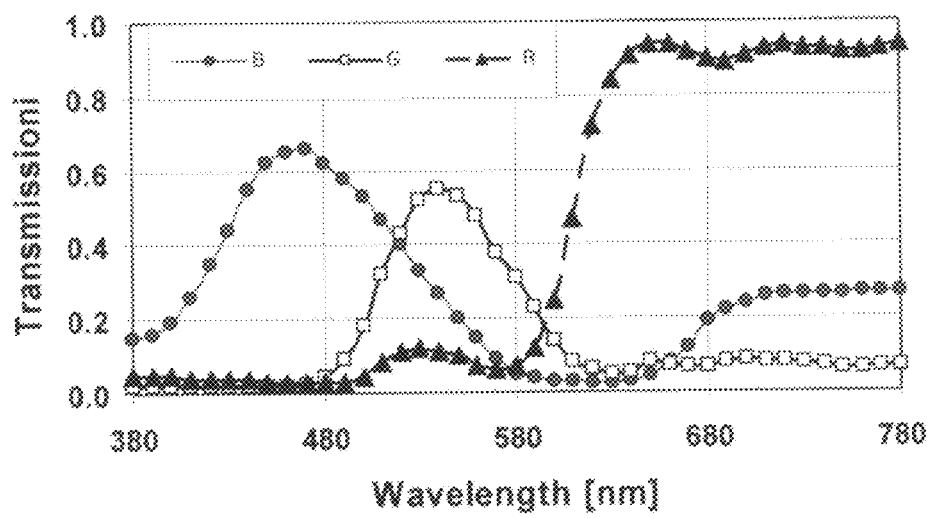
FIG. 11 is a plot of the spectral transmission of the absorption based filters of a typical LCD panel.
Figure 12:
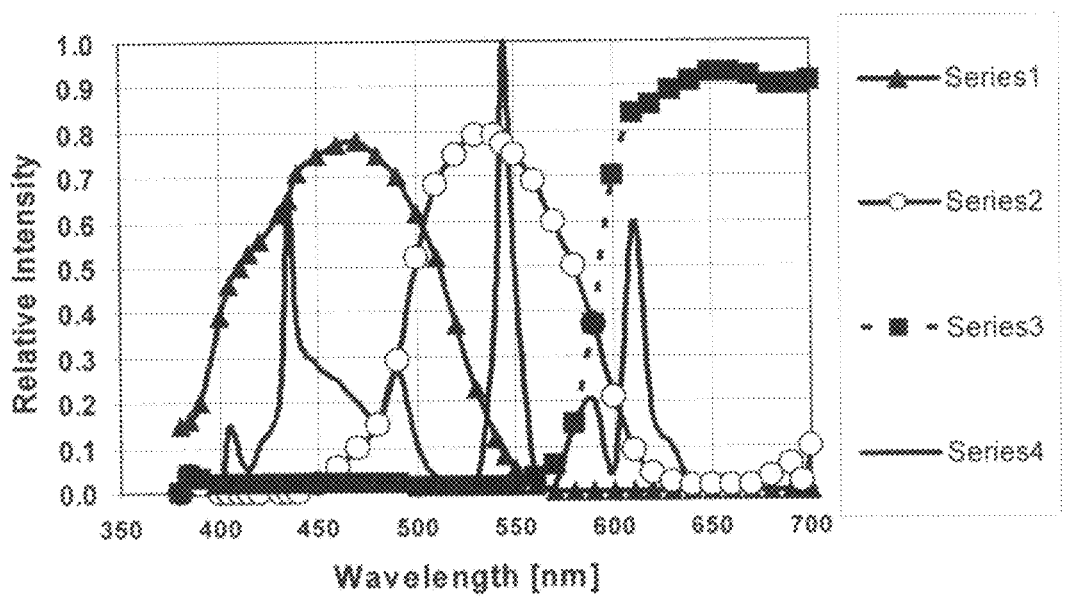
FIG. 12 is a plot of the spectral emission from a CCFL relative to the transmission of the LCD filters.

FIG. 11 shows the transmission spectra of the red, green and blue absorption filters typically used in LCD panels. The overlap of different colors can lead to decreases in the effective size of the color gamut and decreased contrast if there is significant source light in these regions, as is characteristic of the CCFL spectrum as indicated in FIG. 12. As seen in FIG. 12, the spectrum of CCFL has significant flux just at these overlap regions, which is characteristic of the lamp chemistry and leads to poor color performance and contrast.

Figure 13:
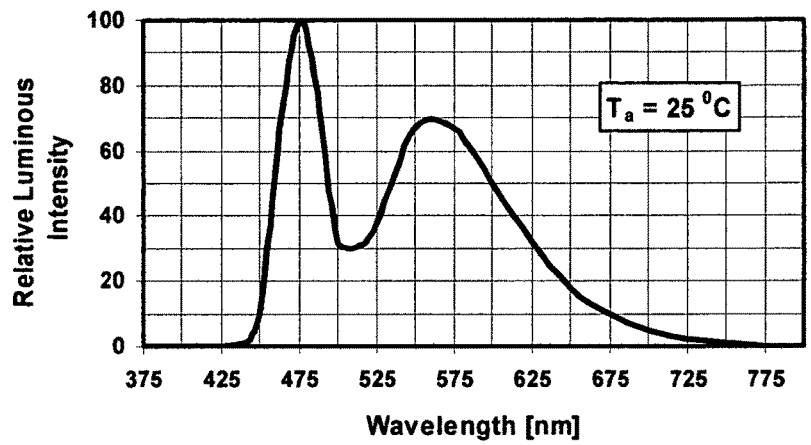
FIG. 13 is a plot of the spectral emission of a typical white LED derived from Ce:YAG excited by a blue LED.
Figure 14:
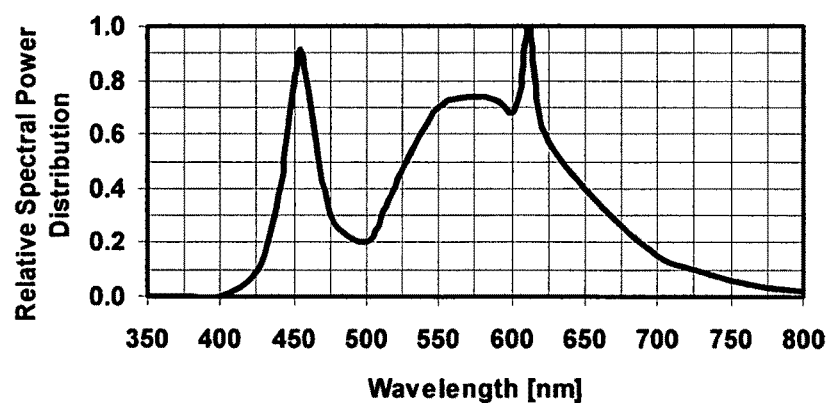
FIG. 14 is a plot of the spectral emission of a typical white LED derived from YAG:Ce excited by a blue LED with the addition of a red LED.

Reference is now made to FIG. 13 for its showing of the spectral emission of a blue LED used with a yellow phosphor. FIG. 13 shows a typical blue LED plus cerium YAG phosphor emission spectrum. This spectrum is low in red output, so some have suggested adding in light from red LEDs to supplement the red as indicated by the spectral emission shown in FIG. 14. However, these spectra suffer from significant emission in the overlap regions of typical LCD filters, and thus do not offer good color performance.

Figure 15:
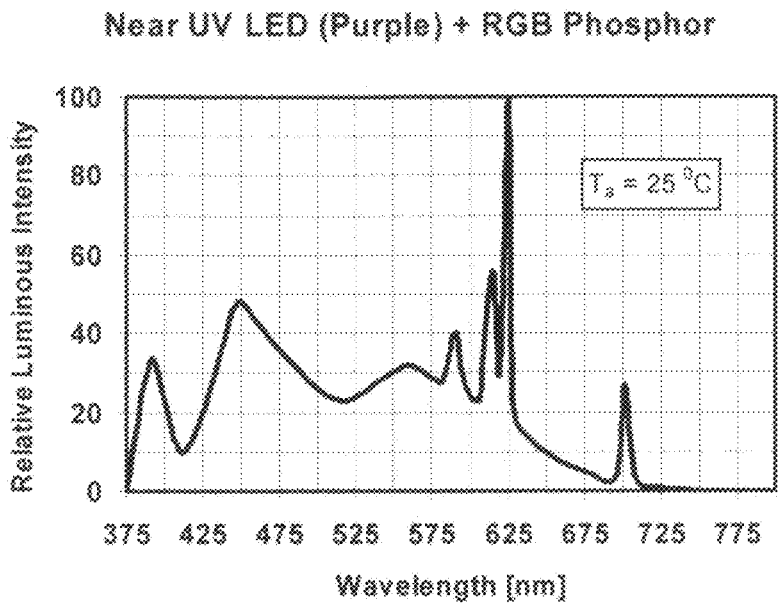
FIG. 15 is a plot of the spectral emission of a white LED derived from red, green, and blue phosphors excited by a near UV LED.

FIG. 15 shows another approach using red, green, and blue phosphors with relatively broad spectra excited by near UV LEDs in the region of 400 nm. This spectrum also suffers form significant spectral overlap. The use of the shorter wavelength excitation also leads to decreased luminous efficiency relative to phosphors excited with blue die due to the increased quantum deficit (difference in energy of emitted photon relative to energy of exciting photon).

Figure 16:
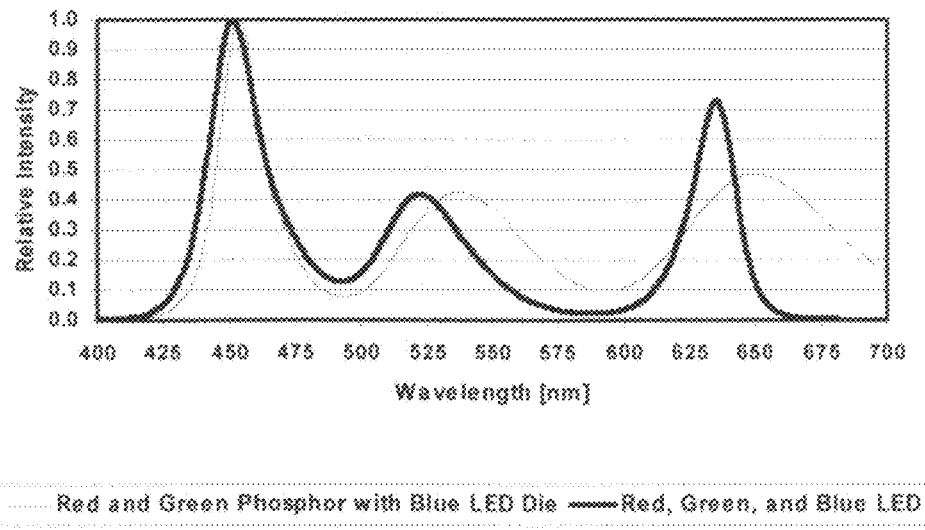
FIG. 16 is a plot of the spectral output of a red, green, and blue die in comparison with that from a green and red phosphor excited by a blue LED.

FIG. 16 shows a comparison between typical RGB LED die and that of blue excited red and green phosphors. By selection of a phosphor of high quantum yield with good excitation overlap with the blue LED source and minimal light output in the LCD filter overlap regions, an LCD backlight device with excellent color performance and contrast can be obtained as will be appreciated from the explanation to follow.

Figure 17:
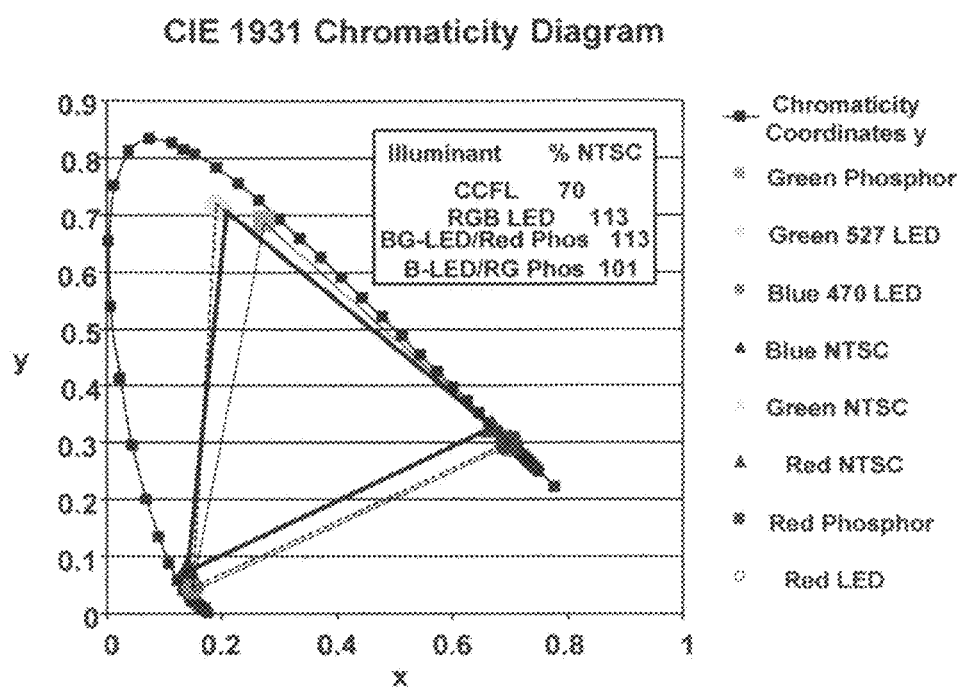
FIG. 17. is a plot of the 1931 CIE x and y chromaticity coordinates indicating the color gamut that can be achieved by the use of RGB LEDs or phosphors.

Reference is now made to FIG. 17 which shows the CIE 1931 chromaticity diagram. The locus of points with the squares indicates the locus of saturated colors from saturated blue near 400 nm in the lower right corner to saturated green toward the top and saturated red near 700 nm in the lower right corner. Also indicated are the x and y color coordinates of the CCFL, RGB LED, Blue excited red and green phosphor, and Blue and Green excited Red Phosphor. The CCFL is shown to typically only provide 70% of the NTSC (National Television System Committee) recommendation for color gamut (color space on 1931 CIE chromaticity diagram). In contrast, the RGB and BG-red phosphor systems yield more than 110% of the NTSC, and the particular choice of phosphors for the blue excited red and green phosphors yields just over 100% of the NTSC recommendation. This is also better than typical CRT (cathode ray tube) performance, which is on the order of 80% NTSC. Consequently, use of the RGB and BG-red phosphor systems are preferred for use in the embodiments of the invention to be described.

Figure 18:
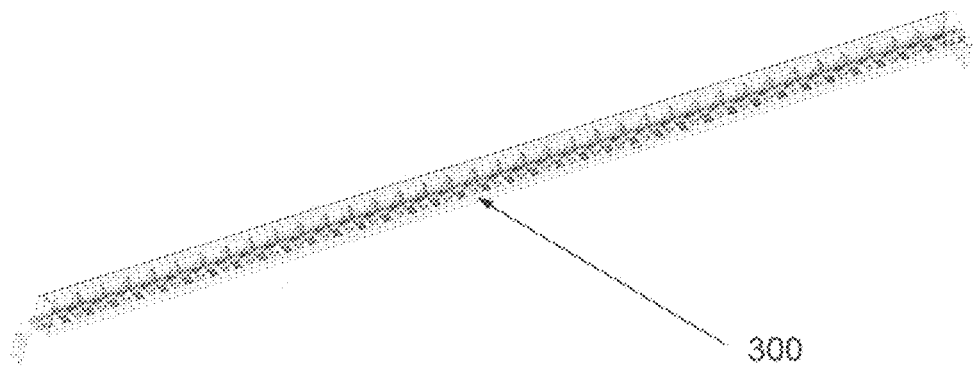
FIG. 18 is a diagrammatic perspective view of one embodiment of an edge light LED source according to the invention.
Figure 19:
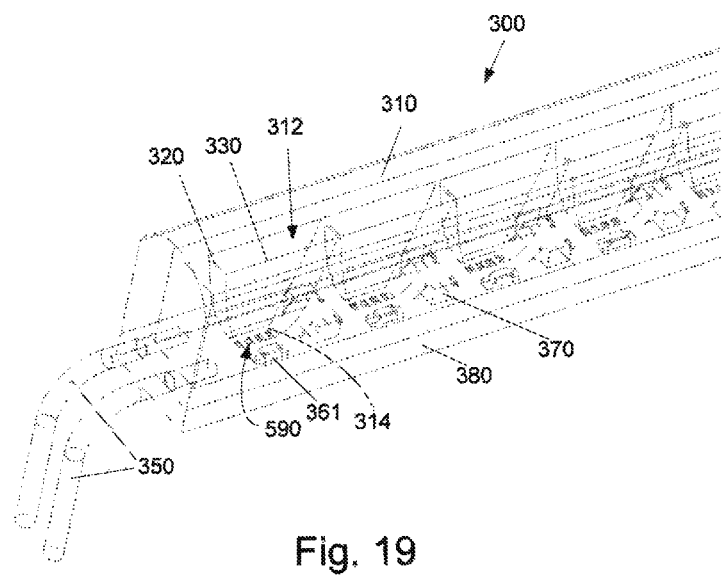
FIG. 19 is an enlarged diagrammatic perspective view of the edge light LED source of FIG. 18 showing features in more detail.

One embodiment of the system of the present invention which employs the LED systems preferred above is designated generally at 300 in FIG. 18 and shown in more detail in FIG. 19. showing an edge light configuration of an integrated "chip on board" system. As seen, system 300 has a generally elongated architecture for generating line sources of substantially uniform output over a predetermined area and angle.

The small dimensions of the input aperture, typically on the order of 1 to 6 mm, for edge lighted systems of the type indicated above in FIGS. 1 and 2, forces a direct transmission geometry. However, the present invention employs an elongated solid transparent plastic molded optic 310 (preferably a cylindrical lens with circular or aspheric surfaces fed by the outputs of a series of regularly spaced non-imaging concentrators 312 each of which has features comprising either equal or different input and output dimensions 320 and 330 to effectively capture substantially all the light emitted from correspondingly spaced LED dies or die arrays 590. The concentrators 312 are preferred to be generally rectangular for formatting their output in two perpendicular azimuths, and collecting radiation via an input aperture or facet 314 and emitting it via an output aperture or facet 316 having sides 320 and 330. The non-imaging concentrator may also be of circular cross-section. The longitudinal cross-sectional shape of the non-imaging concentrator, i.e. the variation in shape along optical axis, is determined using well-known optical design tools and principles as, for example, described in U.S. Pat. No. 7,153,015 issued on Dec. 26, 2006 and entitled LED WHITE LIGHT OPTICAL SYSTEM and Winston, Roland et al., NONIMAGING OPTICS, Elsevier Academic Press (2005).

In a preferred embodiment of this system, the LED 590 is a blue die with the input aperture 314 of the non-imaging concentrator 312 coated with a phosphor(s) or other luminescent material to convert a portion of the blue light to the green and red portion of the spectrum for reasons detailed above. For low temperature or low brightness applications, the phosphor or luminescent material is deposited directly on the LED die or die array 590. For higher temperature or higher brightness applications, the deposition of the light converting material onto the input aperture 314 of the non-imaging concentrator 312 minimizes the thermal quenching that may otherwise decrease luminous efficiency. An index matching material, such as silicone gel or the like, can be applied between the LED die or die array 590 and the phosphor deposited on the input aperture 314 of the non-imaging concentrator 312. Some recently available LED die such as the CREE EZ die have high extraction efficiency into air and would not necessarily require index matching, which would decrease system complexity and associated cost.

Application of the light converting material directly onto the collection optic input aperture 314 can also lead to better color uniformity and decreased processing and thereby decreased system cost. The light converting material is mixed with an index matching adhesive, such as silicone gel, can be applied by a number of methods including spraying, ink jet, and direct dispensing. For an increased level of control and ease of voltage control, current limiting elements 361 and 370 are attached directly to the "chip on board" PCB 380 consisting of a metal substrate of high thermal conductivity, such as copper or aluminum covered by dielectric and copper foil layers comprising the circuit traces fabricated with customary photolithographic processes. Die 590 is attached directly to the metal substrate as indicated in FIG. 8 to increase system performance and decrease cost. Leads 350 attach directly to the traces on the PCB board 380.

The non-imaging concentrator 312 is formed as a compound parabolic, elliptical, or hyperbolic concentrator, with either a substantially circular or a preferably rectangular cross section. It may also have more complex curvatures describable by higher order polynomial functions. The output face 316 of the optic 310 can include features to further homogenize the light if desired. Optic 310 is designed to couple substantially all the light exiting its aperture into the wedge plate (see FIG. 2) of the LCD such that the inefficiencies associated with the use of a secondary reflector are substantially eliminated, improving both brightness and cost. An alternative to the concentrator described would be a straight circular or rectangular cone.

Figure 20:
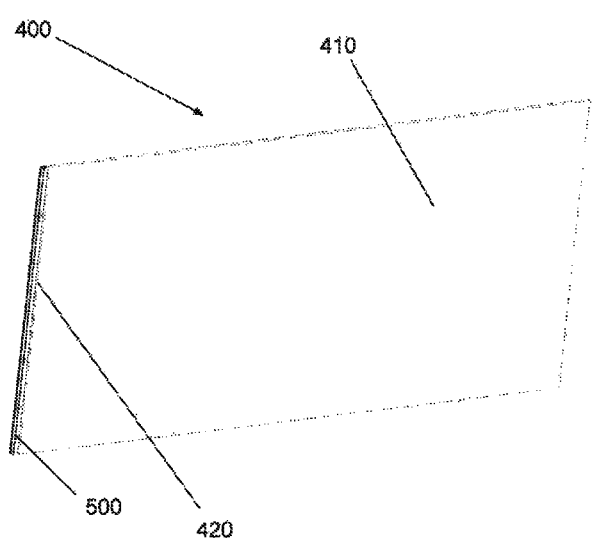
FIG. 20 is a diagrammatic perspective of a large format LCD sheet light guide with a side ejecting LED module linear array.

A preferred embodiment of the present invention is shown in perspective view in FIG. 20 where it is designated at 400 as a large format LCD sheet light guide with a side ejecting LED module array in accordance with the invention. A large format LCD sheet waveguide 410 is edge lighted by a linear array 420 of LED light source modules 500. The modules 500 are designed to efficiently capture light from a plurality of LED die and direct the light into the side of the sheet waveguide 410. It will be understood that the regularly spaced modules or LED subsystems 500 may contain one or more LED emitting areas of one or more colors. The sheet waveguide is provided with features to redirect the injected light in a direction substantially normal to the face of the sheet waveguide 410 such that a uniform area of light is emitted over the total surface extent of the sheet directing light toward the LCD elements of the display system as described in FIG. 2.

Figure 21:
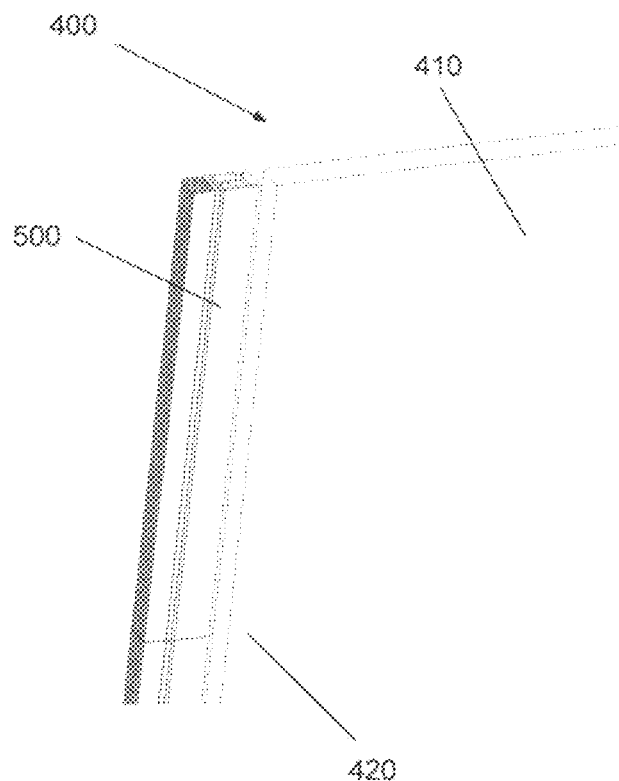
FIG. 21 is an enlarged diagrammatic perspective view of the system of FIG. 20 showing more detail for an individual edge lighting module.

FIG. 21 represents an enlarged view of the upper left corner of the system of FIG. 20 showing more detail of a single LCD edge light module 500. The light exits the right hand side of module 500 and enters the waveguide sheet on the near side 420.

Figure 22:
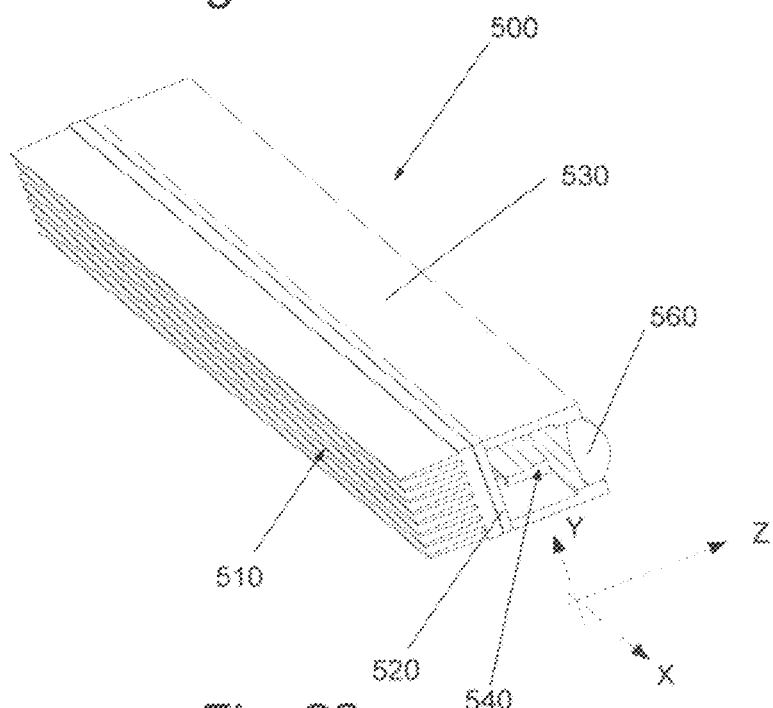
FIG. 22 is a diagrammatic perspective showing a single LED LCD edge injecting light source module of the system of FIG. 20.

FIG. 22 shows greater detail of the module 500. The LED die are mounted to a metal core "chip on board" LED printed circuit board (PCB) 520 which serves as an elongated support. The heat from the LED die passes through the metal substrate of the PCB board 520 and spreads out prior to thermally dissipating into a heat extruded heat sink 510, which is made out of a light thermally conductive material such as aluminum. A non-imaging collection optic 540 is index matched to a linear array of regularly spaced LED die or modules 590 (See FIG. 19). The output of the collection optic 540 is substantially collimated, but may be made to converge, by cylindrical lens 560. Preferably, it is collimated for ease of entry into the edge of the flat guide 410.

The collection optic 540 and the collimating optic 560 are made of a suitable low cost high temperature optical grade plastic such as polycarbonate, or the like, are held in place relative to the PCB 520 by a holder 530, which is preferably molded as an integral part of either collection optic 540 or collimation optic 560. Generally, the purpose of the collection optic 540 is to receive the output of the LED die or modules 590, which emit into a hemisphere over a solid angle of $2\pi$, and reshape it into a generally rectangular diverging beam of predetermined angular extent in vertical (those parallel to the y-z plane) and horizontal planes (those parallel to the x-z plane) such that the diverging beam is uniform in both intensity and spectral content before entering the rear surface of cylindrical lens 560 where it is converged in the vertical plane.

Figure 23:
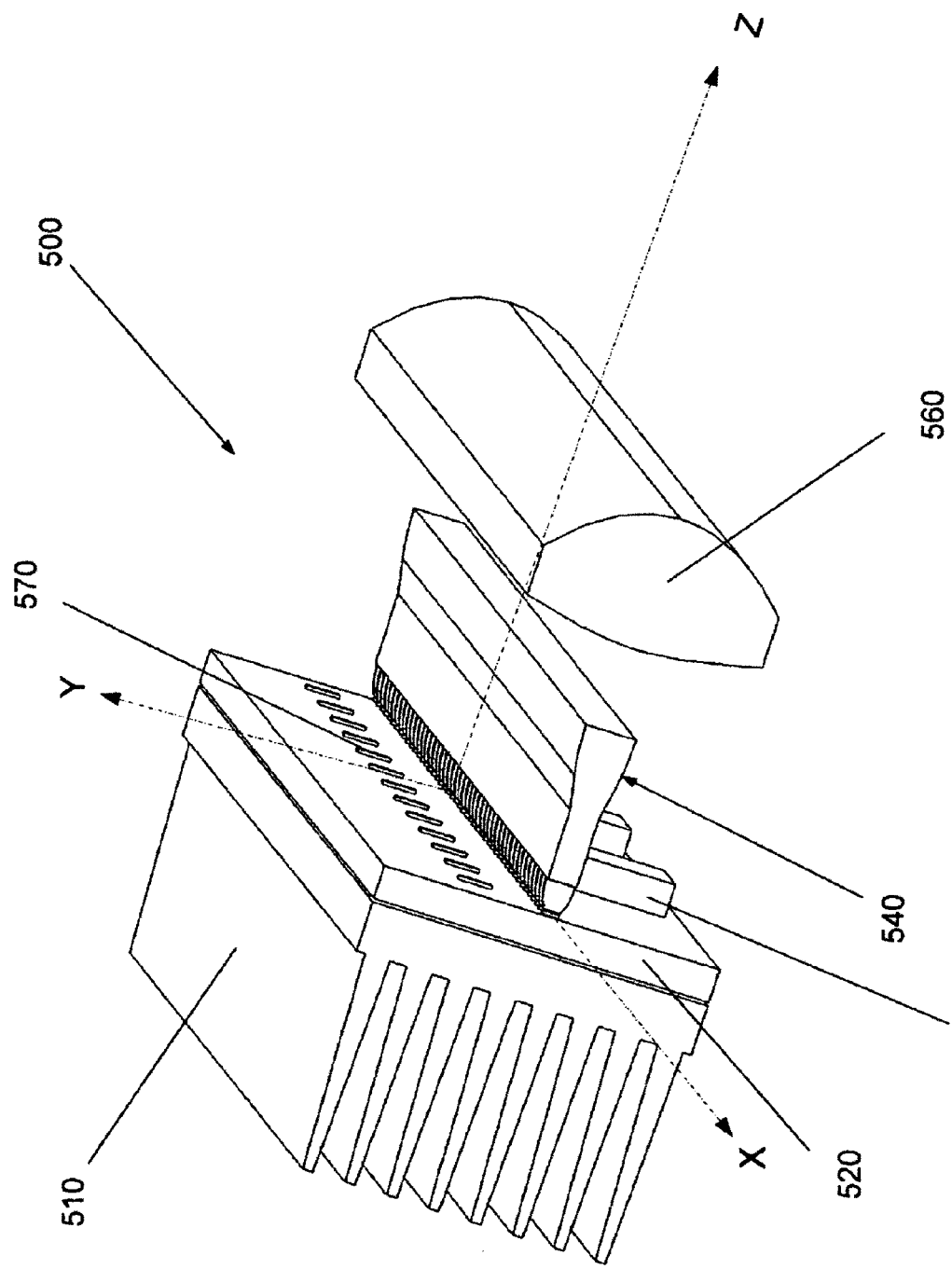
FIG. 23 is an enlarged diagrammatic perspective view of the LED module of FIG. 22 indicating details of the arrangement of LED die, optics, and electrical drive components.
Figure 25:
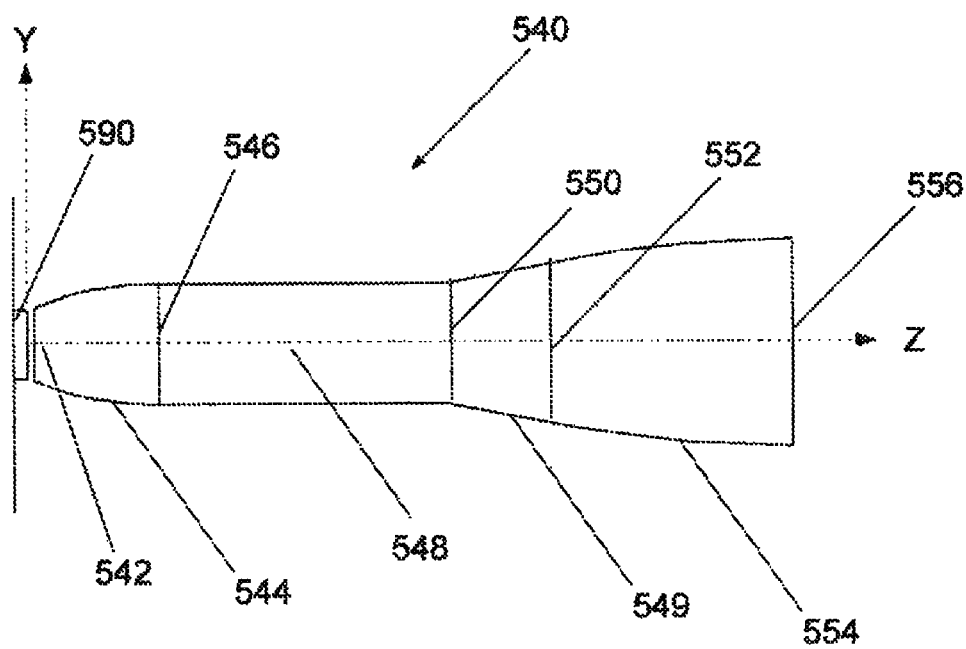
FIG. 25 is a side elevational view of a detail of the non-imaging collection optic of the system of FIG. 23.
Figure 26:
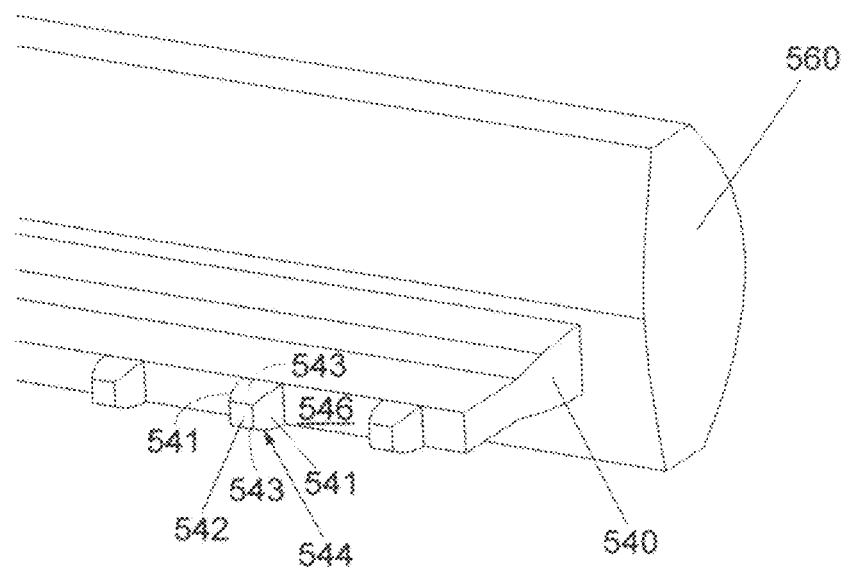
FIG. 26 is an enlarged rear perspective view showing details of the input side of the collection optic of FIG. 25 indicating individual rectangular compound parabolic concentrators that are index matched to the array of LED die.

FIG. 23 shows even more detail of the module 500 of FIG. 22 from a different perspective. The holder 530 is hidden to reveal underlying details of the invention. The side view of collection optic 540 shows its cylindrical form factor. In FIG. 26, a rear perspective, it can be seen to have a lengthwise input aperture 546 for receiving light from each individual LED die or module 590 (See FIGS. 24 and 25) in a manner to be more fully described.

The LED die or die modules 590 can take on many different geometries. The LED die 590 can all be blue with use of one or more phosphors as described previously. This is a good replacement for white CCFL's. However, recent improvements in LCD performance have included time sequential color for which it is necessary to have all three RGB colors present in the correct proportions to achieve the required color gamut. In this case, the individual colors over the LCD pixels could be eliminated, which has the dual benefit of improving optical transmission and increasing the effective pixel resolution.

Large panel displays for the home theater market are in the range of about 40 to 70 inches in diagonal with a typical high definition aspect ratio of 16 by 9. Thus, the linear array of edge emitting LED modules 590 could be required to have a length on the order of 900 mm. If we assume a total Lumens requirement on the order of a few to several thousand Lumens, then the order of 250, 0.5 mm on a side LED die, would be required, which would result in a spacing on the order of 4 mm between LED die. Optimally, the LED die would be attached by means of a eutectic or regular solder of high thermal conductivity and small thickness and not by comparatively lower thermally conductive epoxy. The relative efficiencies and CIE color point requires the LEDs to be roughly in the ratio of 2 green die per 1 each of red and blue die. One arrangement can be GGBGGRGGBGGR . . . , but that puts six spaces between successive red or blue die, which would not be optimal with respect to color mixing on the nearest edge of the sheet waveguide 410 of FIG. 20. A better option is an arrangement of GBGRGBGRGBGR . . . , which results in a spacing of only 4 die between successive red or blue die and yields better near field (close to the input aperture of the sheet waveguide) intensity and color uniformity.

As seen in FIG. 23, photodiodes 570 are provided on the PCB 520 to sample the intensity from the LEDs. Color absorption materials, or low cost gel color filters, can be placed over the photodiodes to allow adequate spatial and spectral sampling of the output of the module 500. Adequate light not coupled into the collection optic 540 is available to provide sufficient signal to noise ratio (SNR) to provide the necessary input to allow for closed loop control on a per color basis. The multiple photodiodes per color, spaced uniformly along the board in line with the LED array, are averaged or summed to provide a good average representation of the light exiting module 500. One or more application specific integrated circuits (ASIC)s 580, or equivalent discrete electrical components, known to the art are used to monitor the photodiodes 570 and use this signal to close the loop on the current to the LEDs 590 as a function of the total light emitted by the module on a per color basis. Thus, an input signal would be proportional to the output intensity over both time and temperature so as not to require auxiliary external closed loop control along with its associated complexity and cost. It is also possible to place thermistors on the same PCB 520 to monitor temperature.

Figure 24:
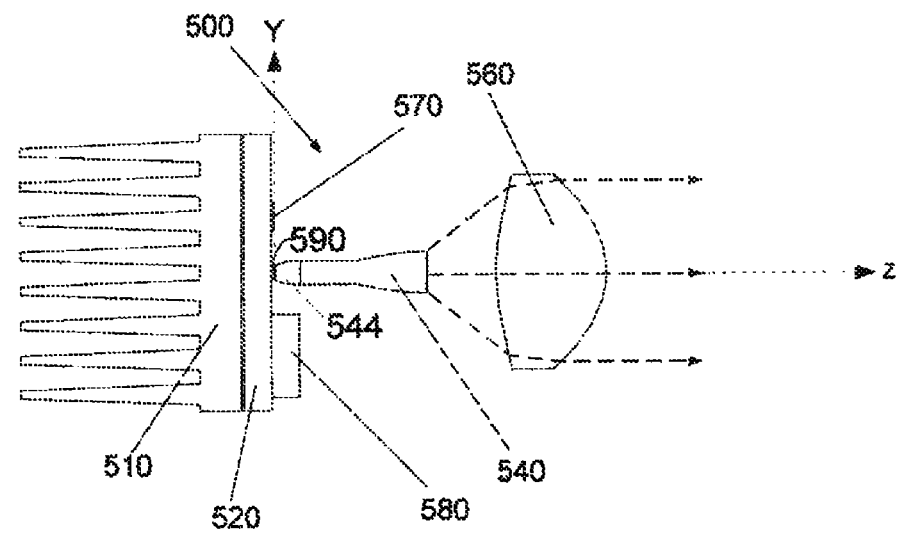
FIG. 24 is a diagrammatic side elevational view of the system of FIG. 23.

FIG. 24 shows a side view of the module 500 of FIG. 23. An enlarged view of just the collection optic 540 and LED die or module 590 is shown in FIG. 25. LED die or modules are 590 are index matched (index of refraction near of equivalent to that of the plastic collection optic 540) at the interface with a plurality of corresponding non-imaging concentrator sections 544. The green surface emitting state of the art LED die increase their output by the order of 20 to 40% relative to their output into air when index matched in comparison to nearly a factor of 2 increase for red LED die. The optical system can be made to work if it were not index matched, but at the expense of this loss in efficiency, which is significant.

The output of collection optic 540 is shown to be substantially collimated by cylindrical lens 560, which ideally would have aspheric profiles on both its input and output faces to improve collimation and preserve the Etendue (surface area, solid angle, index squared product).

The use of the non-imaging collection optic 540 with a relatively large divergence in combination with a short focal length for the lens 560 results in substantially conserved Etendue within a very short length, which is a critical factor in maintaining the smallest overall size display for a given diagonal dimension. An appropriate high thermal conductivity material such as thermal grease, gap or sil pad (Bergquist Company), or phase change material would be placed between LED PCB 520 and heat sink 510.

FIG. 25 shows the many important sections of the collection optic 540. Starting from the LED die 590 attached to the PCB 520, the light first passes through index matching material such as silicone gels, which have the properties of very high temperature operation and freedom from yellowing with time. The light then enters an input aperture 542 (FIG. 26) of a corresponding rectangular CPC section 544 whose dimensions closely are matched to the dimensions of a corresponding LED die with which it is optically associated. The LED die are also positioned so that they fill this input aperture 542 to assure uniformity in intensity when outputted from CPC section 544. Each non-imaging rectangular non-imaging concentrator section 544 operates to collect the radiation emitted by the LED die over a hemisphere and convert it for propagation downstream as a rectangular beam of smaller angles in both the vertical and horizontal planes.

Referring now to FIG. 26, it can be seen that each rectangular con-imaging concentrator section 544 is provided with opposing pairs of sides 541 and 543 that are shaped to selectively converge light entering its input aperture so that it emerges as a diverging rectangular beam of predetermined angular extent in both horizontal and vertical planes.

The diverging beams emerge from each non-imaging concentrator section 544 from a corresponding output aperture 546 and immediately enter a mixing section 548 that is elongated in the direction of the x-axis. The light in entering mixing section 548 via output aperture 546 of CPC section 544 is maintained at a high level to maximize mixing of the three colors through mixing section 548. The angular extent of the beam in the vertical plane emerges from the mixing section 548 over the same vertical angle and does not grow in height. However, light in the horizontal plane spreads in the horizontal plane so that it grows in width compared with its width upon entering mixing section 548. This is done so that, when light emerges ultimately emerges from optic 540, it is uniform in both horizontal and vertical planes.

Mixing section 548 can be increased or decreased in length depending on the mixing requirements and relative spacing between individual die. The output of the mixing section 548 exits its aperture 550 and then enters a cylindrical conical section 549 of a θ by θ compound parabolic concentrator (CPC) and next enters aperture 552, which starts the parabolic section of a CPC 554, which exits the collection optic at aperture 556. It is critical that the rectangular output of section 544 yields an angle in the horizontal direction that is outside the limit of being totally internally reflected at aperture 556 for light emitted in the plane of the sheet waveguide 410 (FIGS. 20 and 21). If this were not the case, approximately 50% of the light would be lost due to total internal reflection (TIR) at exit aperture 556.

The cylindrical conical section 549 is configured to control the vertical angle of the beam leaving the mixing section 548 so that it enters the truncated CPC section 554 and emerging from it as a beam uniform in intensity and spectral content before striking the rear surface of cylindrical lens 560.

Alternatively, optic 540 can be made of sections of tapers instead of CPCs, but at the expense of some increase in length and decrease in efficiency. FIG. 26 shows a detail of the rectangular input CPC section 544 and an end on view of input aperture 542 which would be index matched to an LED die 590.

In addition, where uniformity of spectral content can be relaxed, the mixing section 548, cylindrical conical section 548, and truncated CPC section 554 can be dispensed with to provide line sources.

Figure 27:
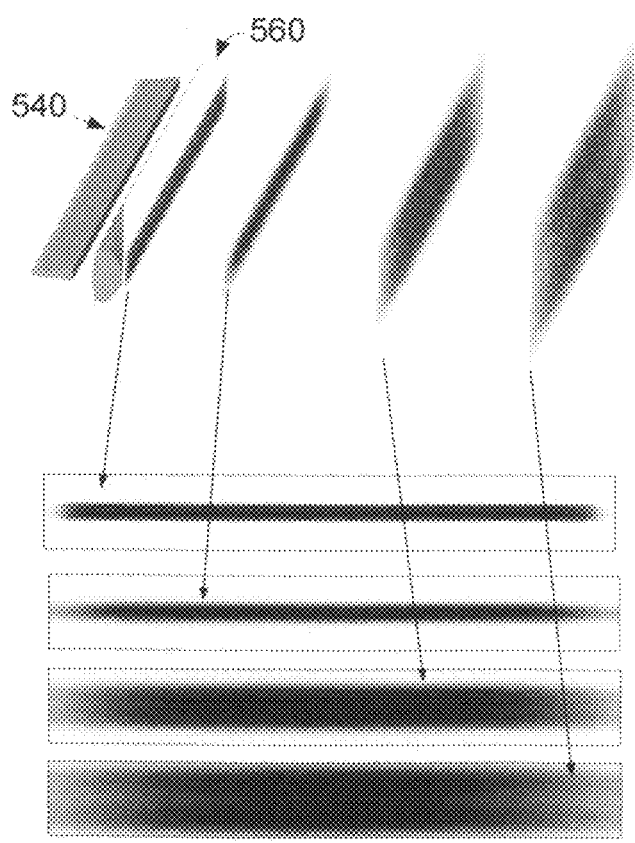
FIG. 27 shows a perspective view of the collection optics and collimating lens of the system of FIG. 24 in non-sequential mode of the ZEMAX optical modeling software with the uniform intensity profiles (shown as negative images) at a range of sampling planes indicating substantially uniform mixing of each color LED.

FIG. 27 shows optical modeling results using the non-sequential mode of ZEMAX optical modeling software. The image shows (as negative images) four intensity profiles in different planes ranging in position from immediately exiting the module 500 to a few inches away. The sheet waveguide would be placed in the approximate position of the first plane on the left. Arrows are shown pointing from the various planes on the top image to the simulated successive intensity profiles on the bottom. The data represents the intensity distribution that would result from a single color LED die with a spacing of every 4 die reflected by the GRGBGRGBGRBG . . . geometry described above. Thus, this invention is shown to result in excellent collimation and near field uniformity for all colors within a very compact package ideally suited for large format large area edge lighted LCD displays.

Figure 28:
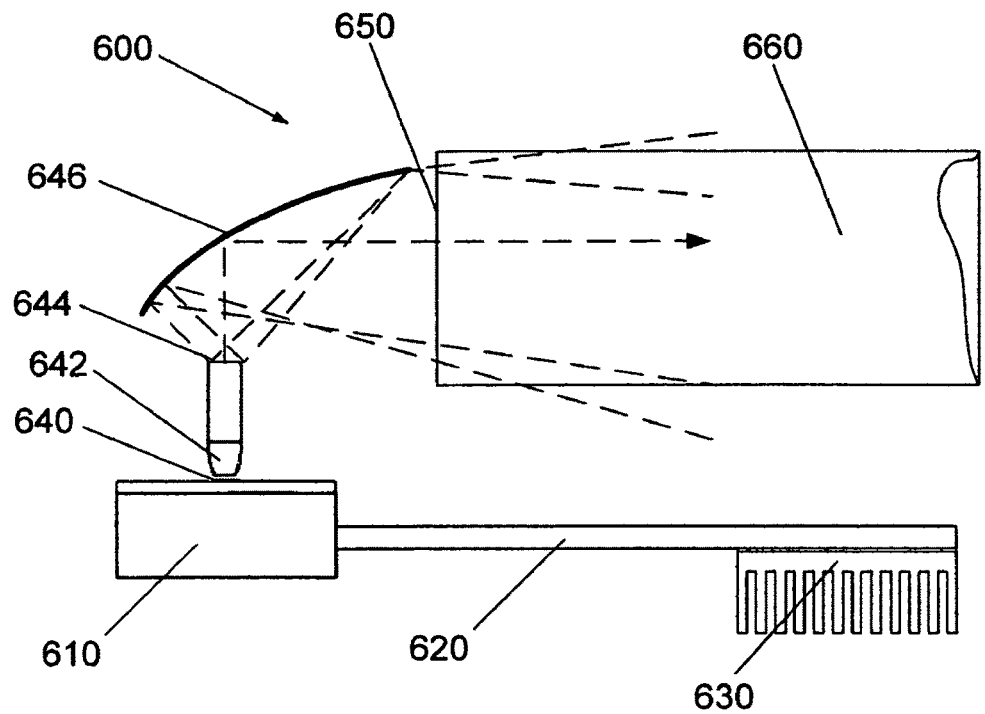
FIG. 28 is a diagrammatic side elevational view of an alternative embodiment of an LED side injecting light source for a large area LCD panel comprised of a collection optic input similar to the front end section of the system of FIG. 26 which is deflected at a right angle into an LCD light guide by use of a substantially off-axis cylindrical parabolic reflector. Also illustrated is a method of rejecting the heat on the large area at the back of the display panel by use of heat pipe technology.

FIG. 28 shows an alternative embodiment 600 comprised of an LED die array 640 similar to that of module 500 and an input section 642 similar to sections 544 and 548 of FIG. 25 with the output directed to a substantially cylindrical off-axis parabola 646 for the purpose of directing the output through an angle of substantially 90 degrees to an input aperture 650 of a sheet waveguide 660. This arrangement would more readily allow the heat to be rejected on the back plane of the display by a device 610, 620, and 630 comprising a heat pipe of the type that has become popular for cooling computer CPUs. There is a significant area for cooling available on the back of a large format display so it would be easy to reject a substantial heat load by convective air cooling by moving the heat to the back plane of the display by use of the heat pipe technology.

Figure 29:
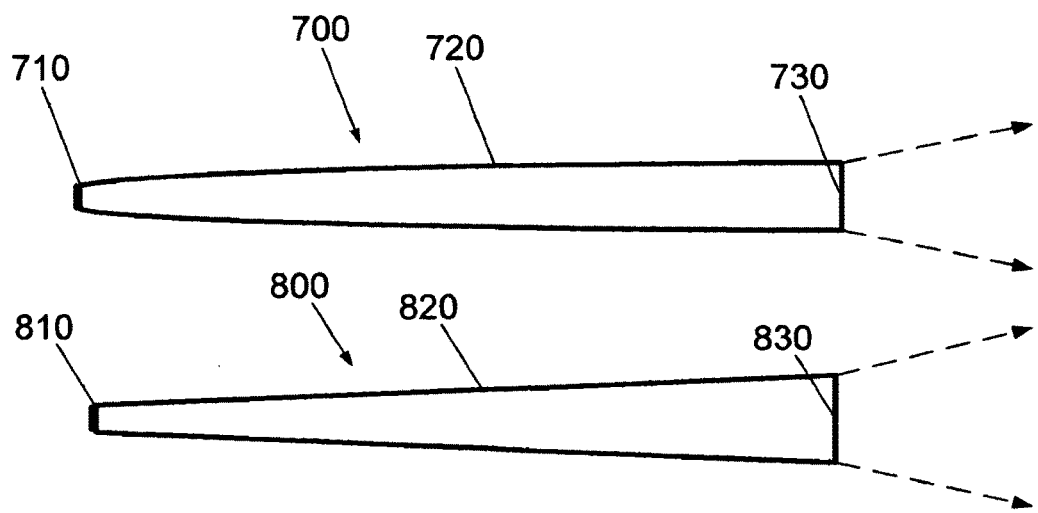
FIG. 29 is a diagrammatic side elevational view showing both a narrow output angle CPC (top) and taper (bottom) index matched to an LED array indicating that these elements by themselves result in an excessively long optical path. The inputs would have to be similar to those of FIG. 26 to prevent losses due to total internal reflection in the orthogonal axis which would otherwise occur with the Lambertian LED input.

FIG. 29 shows two embodiments of an optical device 700 and 800 using a very long CPC profile 720 and straight taper 820 to result in the required output divergence at exit apertures 730 and 830, respectively. The input region near the LED die 710 and 810, respectively, would have to include a feature such as shown by rectangular CPC section 544 of FIG. 26 as to prevent TIR of the light in the plane of the sheet waveguide (into the page). The great disadvantage of these two configurations is the exceedingly long length of the optic which would require the outside dimensions of the display to be larger than desired relative to the compact design of module 500.

Figure 30:
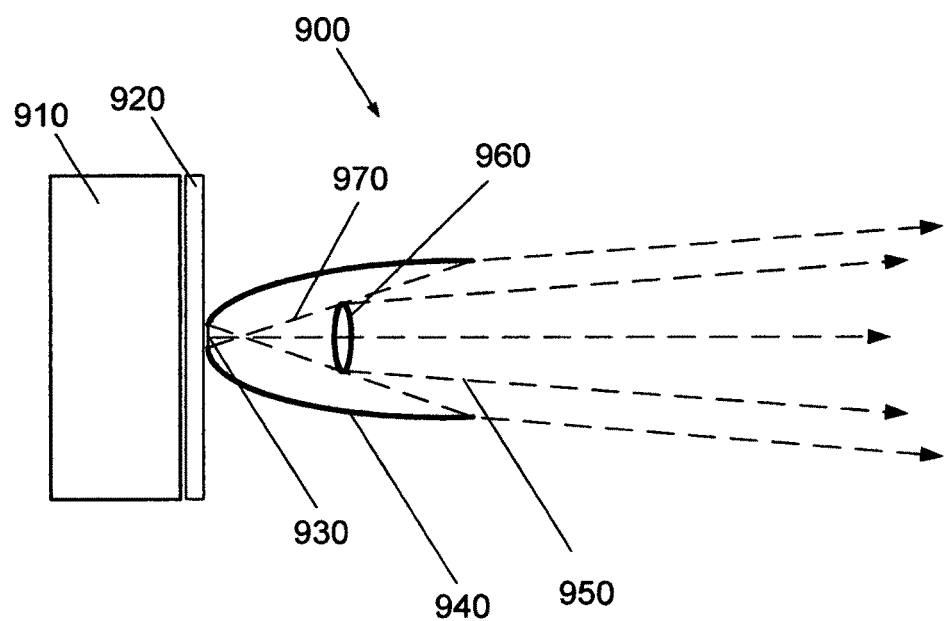
FIG. 30 is a diagrammatic side elevational view of an alternative embodiment using a hollow reflective cyclindrical collection optic such as a CPC or parabola in combination with a centrally located collimation lens structured so as to substantially capture all the light emitted from the Lambertian LED source.

FIG. 30 shows yet another alternative embodiment 900 which uses a substantially parabolic cylindrical reflective optic 940 to direct the light from an LED die 930 incident on the reflector 940 into the desired angle space, and the light incident on a centrally located cylindrical collimation lens 960 in the similar direction. This approach would only work in air unless it contained a dome over the individual LED die 930 and would therefore have lower output as described above for non-index matched LED die. Here again, the LED die 930 sits atop a PCB board 920 that is cooled by heat controller 910.

Having described several embodiments of the invention along with its principles of operation and construction, other variants will occur to those skilled in the art. For example, where a line source is needed, it may be provided by eliminating one or more of the mixing section 548 and conical sections of FIGS. 24 and 25 and/or designing lens 560 such that further converges light. Therefore, such variants are intended to be within the scope of the invention.

What is claimed is:

1. Illumination apparatus for producing high intensity line sources of uniform intensity and spectral content, said illumination apparatus having an optical axis and comprising:

an elongated support member having formed thereon a linear array of regularly spaced apart individual LED modules each of which comprises one or more LED emitting areas having a predetermined spectral output that is emitted directly over a predetermined solid angle;

an elongated collection optic having an array of individual regularly spaced apart non-imaging concentrators the individual non-imaging concentrators of which are directly optically coupled in one-to-one correspondence with said regularly spaced individual LED modules, each non-imaging concentrator in said array of non-imaging concentrators having an entrance aperture, and exit aperture, and a cross-sectional rectangular shape that continuously curves and enlarges from said entrance aperture to said exit aperture, each of said LED emitting areas being positioned in a corresponding one of each of said entrance apertures of each non-imaging concentrator so that each non-imaging concentrator operates directly to collect substantially all of the radiation emitted by each of said LED emitting areas and to re-emit substantially all of said collected radiation as a diverging beam having a solid angle smaller than said predetermined solid angle over which radiation is emitted by each of said LED emitting areas where said diverging beam is spatially and spectrally uniform in the near field of said exit aperture and propagates in a direction along an optical axis of said apparatus, and wherein each of said non-imaging concentrators having pairs of spaced apart opposed surfaces that operate to control the divergence of said diverging beam in vertical and horizontal planes mutually perpendicular to said optical axis; and an elongated cylindrical optical lens positioned to receive said diverging beam and converge it in a vertical plane to form a line source of predetermined dimensions.

2. The illumination apparatus of claim 1 wherein said LED emitting areas are selected from the group comprising R, G, B LEDs, Blue LEDs used in conjunction with red and green phosphor, and Blue and Green LEDs used in conjunction with red phosphor.

3. The illumination apparatus of claim 1 wherein said non-imaging concentrators are selected from the group comprising compound parabolic, elliptical, hyperbolic concentrators, and concentrators having curvatures described by higher order polynomial functions.

4. The illumination apparatus of claim 3 wherein said non-imaging concentrators are rectangular in cross section to control the divergence of said diverging beam in vertical and horizontal planes mutually perpendicular to said optical axis.

5. The illumination apparatus of claim 1 said collection optic further includes an elongated planar waveguide mixing section having a single continuous surface for receiving said diverging beams from said non-imaging concentrators, mixing their colors for more spectral and spatial uniformity, and re-emitting them along an exit face thereof for travel to said elongated converging optical element.

6. The illumination apparatus of claim 5 wherein said collection optic further includes an elongated, cylindrical $\theta$ by $\theta$ compound parabolic concentrator section following said mixing section and a second elongated truncated compound parabolic concentrator section following said $\theta$ by $\theta$ compound parabolic concentrator section, said $\theta$ by $\theta$ compound parabolic concentrator section being structured to receive the light emerging from said exit face of said mixing section and direct it into said elongated truncated compound parabolic concentrator section after which the light emerging from said second elongated truncated compound parabolic concentrator section strikes said elongated converging optical element.

7. The illumination apparatus of claim 6 wherein said collection optic is formed as a single piece of injection molded optical plastic.

8. The illumination apparatus of claim 5 wherein said elongated converging optical element comprises a substantially cylindrical off-axis parabolic reflector for directing the output from said collection optic through an angle of substantially ninety degrees.

9. The illumination apparatus of claim 1 wherein said elongated converging optical element comprises a cylindrical lens.

10. The illumination apparatus of claim 9 wherein said cylindrical lens has at least one aspheric surface.

11. The illumination apparatus of claim 1 further including a planar wedge light guide for receiving light from said line source and propagating it along the length of said planar wedge guide, said planar wedge guide having small optical features on one surface thereof to deflect light upwards out of said wedge guide through an exit face thereof opposite to the surface having said small optical features.

12. The illumination apparatus of claim 11 further including a diffuser positioned opposite said exit face of said planar wedge guide to receive light there from to improve its homogeneity and control its angular direction for subsequent use with an LCD display panel.

13. The illumination apparatus of claim 1 further including a heat sink attached to said elongated support member to control the temperature of said illumination apparatus by selectively dissipating heat generated in the process of converting electrical energy to optical power to enhance the quantum efficiency of said apparatus.

14. The illumination apparatus of claim 1 further including a plurality of regularly spaced photodiodes mounted on said support member to monitor the individual output of said LED modules to provide a signal for feedback control of the intensity of light output from said LED modules.

15. The illumination apparatus of claim 14 further including at least one electronic controller mounted on said support member to receive said signals and provide feedback control of said LED modules.

* * * * *